(12) United States Patent
Miyajima

(10) Patent No.: US 7,979,687 B2
(45) Date of Patent: Jul. 12, 2011

(54) QUICK START

(75) Inventor: Takeo Miyajima, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 801 days.

(21) Appl. No.: 11/862,533

(22) Filed: Sep. 27, 2007

(65) Prior Publication Data

US 2008/0086591 A1 Apr. 10, 2008

(30) Foreign Application Priority Data

Oct. 6, 2006 (JP) .................. 2006-275115

(51) Int. Cl.
| | |
|---|---|
| G06F 9/00 | (2006.01) |
| G06F 9/24 | (2006.01) |
| G06F 15/177 | (2006.01) |
| G06F 13/00 | (2006.01) |
| G06F 13/28 | (2006.01) |
| G06F 1/00 | (2006.01) |

(52) U.S. Cl. ............. 713/1; 711/104; 713/2; 713/300
(58) Field of Classification Search .............. 713/1, 2, 713/300

See application file for complete search history.

(56) References Cited

U.S. PATENT DOCUMENTS

| | | | | | |
|---|---|---|---|---|---|
| 6,016,263 | A | * | 1/2000 | Chen | 365/51 |
| 6,226,740 | B1 | * | 5/2001 | Iga | 713/2 |
| 6,748,457 | B2 | * | 6/2004 | Fallon et al. | 710/2 |
| 7,032,105 | B2 | * | 4/2006 | Lin | 713/1 |
| 7,047,356 | B2 | * | 5/2006 | Chen | 711/113 |
| 2001/0039612 | A1 | * | 11/2001 | Lee | 713/2 |

FOREIGN PATENT DOCUMENTS

| | | |
|---|---|---|
| JP | 11184703 A | 7/1999 |
| JP | 2003-345602 A | 12/2003 |
| JP | 2004-030184 A | 1/2004 |
| JP | 2006-072989 A | 3/2006 |

\* cited by examiner

*Primary Examiner* — Thomas Lee
*Assistant Examiner* — Brandon Kinsey
(74) *Attorney, Agent, or Firm* — Sughrue Mion, PLLC

(57) ABSTRACT

A quick start method for starting up a system easily and quickly is disclosed. A memory control unit reads the start-up data prestored in a storage unit, using auxiliary power supplied from an auxiliary power supply unit. Also, the memory control unit writes the read start-up data into RAM. As well, the memory control unit reads and outputs the start-up data written in RAM when the main power is turned on.

4 Claims, 3 Drawing Sheets

QUICK START

This application is based upon and claims the benefit of priority from Japanese Patent Application No. 2006-275115 filed on Oct. 6, 2006, the content of which is incorporated by reference.

BACKGROUND OF THE INVENTION

1. Field of the Invention

The present invention relates to a storage device for use in starting up a system comprising a computer and its start-up method.

2. Description of the Related Art

Nowadays, a hard disk is mostly used as a storage device for storing an operating system or application program (hereinafter referred to as start-up data) for activating a system comprising a computer or an electronic computer. Particularly in the personal computers in recent years, an enormous amount of data is often processed, whereby there is a great demand for using high capacity hard disks.

The start-up data stored in the hard disk is read from the hard disk when the system is started, and written into a memory such as a RAM (Random Access Memory) accessible by a CPU that is the control unit of the system. Thereby, the system can perform a predetermined process.

FIG. 1 shows one example of the configuration around a storage unit in a typical system comprising memory control unit 1004, storage unit 1007, I/O control unit 1008, CPU 1009, RAM 1010 and BIOS_ROM 1011. I/O control unit 1008, CPU 1009, RAM 1010 and BIOS_ROM 1011 are connected to bus 1012.

Storage unit 1007 is a mass storage device such as a hard disk that stores the start-up data for activating the system. Memory control unit 1004 controls the reading the start-up data stored in the storage unit 1007. I/O control unit 1008 controls each I/O with an I/O instruction to be executed by CPU 1009. RAM 1010 is a storage area for use when CPU 1009 runs a program that includes an operating system. BIOS_ROM 1011 is non-volatile memory that stores firmware for performing initialization and autonomous diagnosis of the hardware at the time to start the system. CPU 1009 is a processor for controlling them.

When the power is turned on in the system having the above configuration, the start-up data stored in storage unit 1007 is read by memory control unit 1004. And the system is started using the read start-up data.

Also, one of the characteristics of a hard disk is that there is a certain probability that failure will occur due to the mechanical structure. Therefore, in a computer system such as a server requiring reliability, it is common that a redundant configuration such as dual hard disk is employed.

In view of this background, recently, a system constituting a storage device using a non-volatile semiconductor storage element (hereinafter referred to as a non-volatile memory) represented by a flash memory was disclosed in JP-2003-345602A. Thereby, reliability can be improved by removing the mechanical unit s from the system.

However, non-volatile memory has the drawbacks in which access speed is typically slower than that of a hard disk and the write number is restricted.

In particular, the slower access speed has a direct influence on the system performance not only in starting the operation of loading or saving the program, but also when the storage device is used as virtual storage by the operating system. Also, there is the problem that slower access speed influences the start-up time of the device, such as system boot up, which needs to be as short as possible.

Thus, there is disclosed in JP-2004-030184A a technique for increasing the speed of the start up operation by storing data, that is stored in the hard disk, in a memory that is connected to a high speed bus, and by reading data, that is stored in memory, when starting the system.

However, in the technique as described in JP-2004-030184A, there is a problem that, when the data stored in the hard disk is transferred to memory that is connected to the high speed bus, the overall system has to be started up.

SUMMARY OF THE INVENTION

An object of the present invention is to provide a storage device with which the system can be quickly and easily started, and also to provide a start up method.

In this invention, the start-up data prestored in a non-volatile storage unit is read by a memory control unit, using an auxiliary power which is different from the main power that is used to start up the system. The read start-up data is written into start-up RAM. And when the main power is turned on, the start-up data that is written into the start-up RAM is read and output to the system by the memory control unit.

Thereby, the time required for starting the system can be greatly shortened.

The above and other objects, features, and advantages of the present invention will become apparent from the following description with reference to the accompanying drawings which illustrate an example of the present invention.

DETAILED DESCRIPTION OF THE PREFERRED EMBODIMENTS

Figure 2:
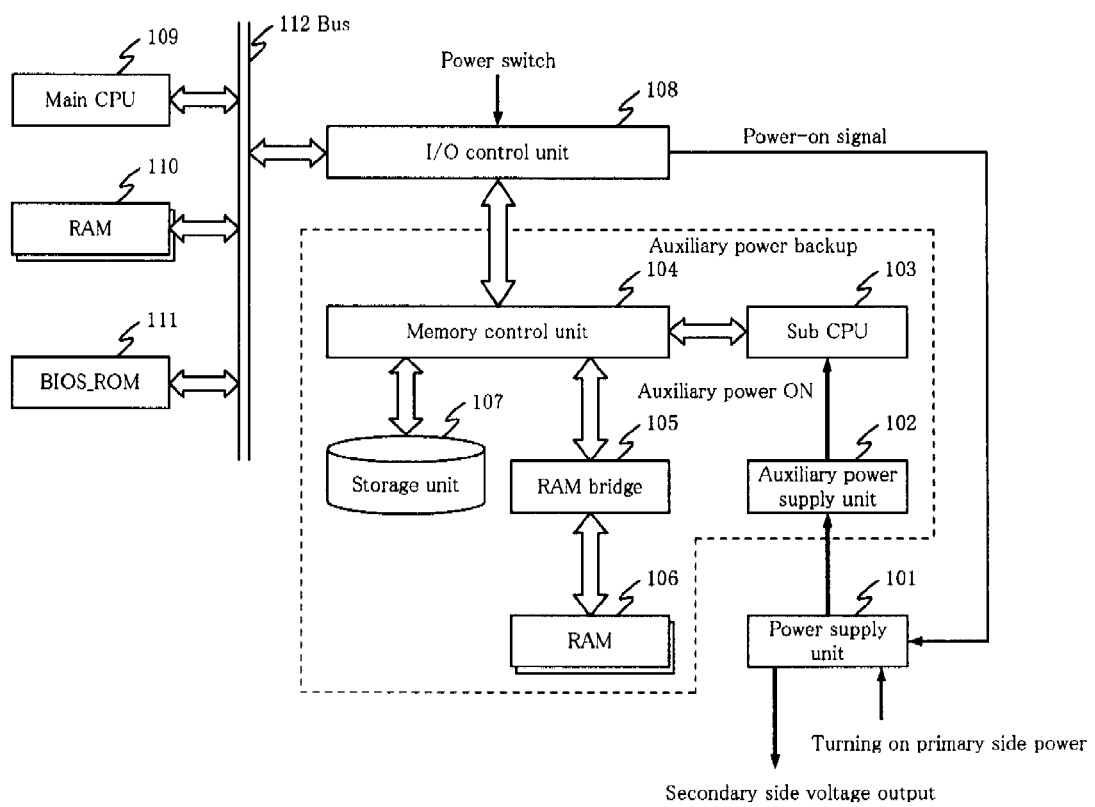
FIG. 2 is a diagram showing one exemplary embodiment of a system to which a storage device of the invention is applied.

Referring to FIG. 2, a system comprises power supply unit 101, auxiliary power supply unit 102, sub CPU 103, memory control unit 104, RAM bridge 105, RAMs 106 and 1 10, storage unit 107, I/O control unit 108, main CPU 109, BIOS_ROM 111 and bus 112. I/O control unit 108, main CPU 109, RAM 110 and BIOS_ROM 111 are connected to bus 112.

Power supply unit 101 is a device for converting AC power supplied from the outside to DC power supplied to the system or to a battery powered device.

Figure 1:
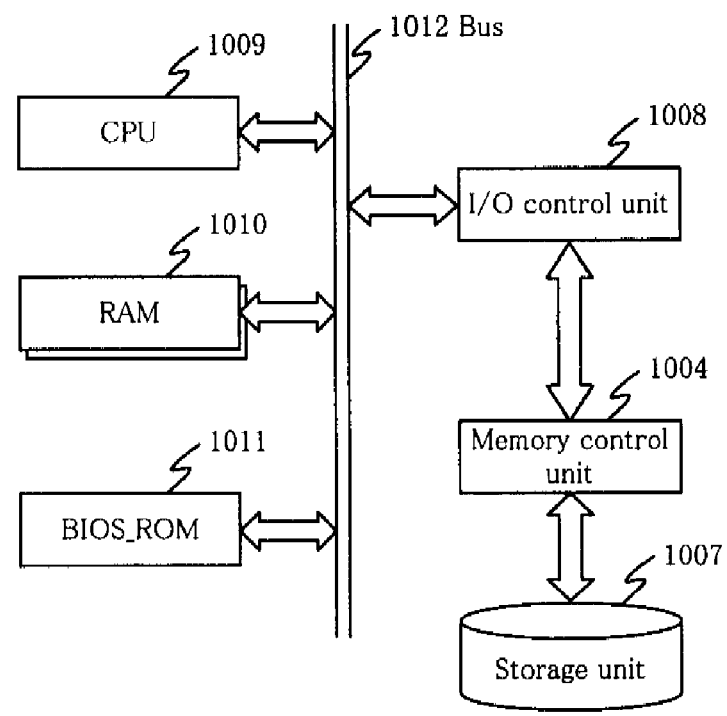
FIG. 1 is a diagram showing one example of the configuration of a storage unit in a typical system.

Auxiliary power supply unit 102 generates auxiliary power supply voltage, based on power supply voltage output from power supply unit 101, and supplies the power to each component enclosed by the broken line in FIG. 1.

The sub CPU 103 is a sub-processor that controls memory control unit 104 in a state where only the auxiliary power supply is turned on. Also, it is connected to memory control unit 104, and outputs to memory control unit 104 instructions for copying the data stored in storage unit 107 that has slower access speed from storage unit 107 via RAM bridge 105 to RAM 106.

Memory control unit 104 controls a plurality of storage devices including RAM 106 and storage unit 107 connected lower it in accordance with an access instruction outputted from I/O control unit 108 or sub CPU 103. In general, it is assumed that a control circuit such as an IDE (Integrated Device Electronics) is used.

RAM bridge 105 converts a control signal such as a write signal or a read signal output from memory control unit 104 to a control signal for controlling RAM 106 connected lower RAM bridge 105. RAM bridge 105 has a function of returning information that shows that the storage device can normally boot the system to memory control unit 104.

RAM 106 is RAM (Random Access Memory) that is a semiconductor memory. It is the start-up RAM, into which digital data including a boot image read from storage unit 107 is written by memory control unit 104, and has a storage area for having the contents while the auxiliary power is applied.

Storage unit 107 stores start-up data such as an operating system or an application program operating on it. Herein, it is a mass storage device such as a hard disk or a silicon disk device using a non-volatile storage element such as a flash memory.

I/O control unit 108 controls each I/O with an I/O instruction executed by main CPU 109. Herein, I/O control unit 108 takes charge of decoding an access instruction to the storage device, and issuing a control instruction to memory control unit 104. Also, a power switch for turning on the main power is connected to I/O control unit 108.

RAM 110 is a storage area for use when main CPU 109 runs a program including the operating system after the main power is turned on.

BIOS_ROM 111 is non-volatile memory that stores firmware for performing the initialization and autonomous diagnosis of hardware when starting the system.

Main CPU 109 is a central processor for controlling each component as described above.

The components using the auxiliary power include sub CPU 103, memory control unit 104, RAM bridge 105, RAM 106, and storage unit 107 among the components as shown in FIG. 2. Also, the components using the main power include I/O control unit 108, main CPU 109, RAM 110 and BIOS_ROM 111. Also, a portion as indicated by the broken line in FIG. 2 corresponds to the storage device of the invention.

Figure 3:
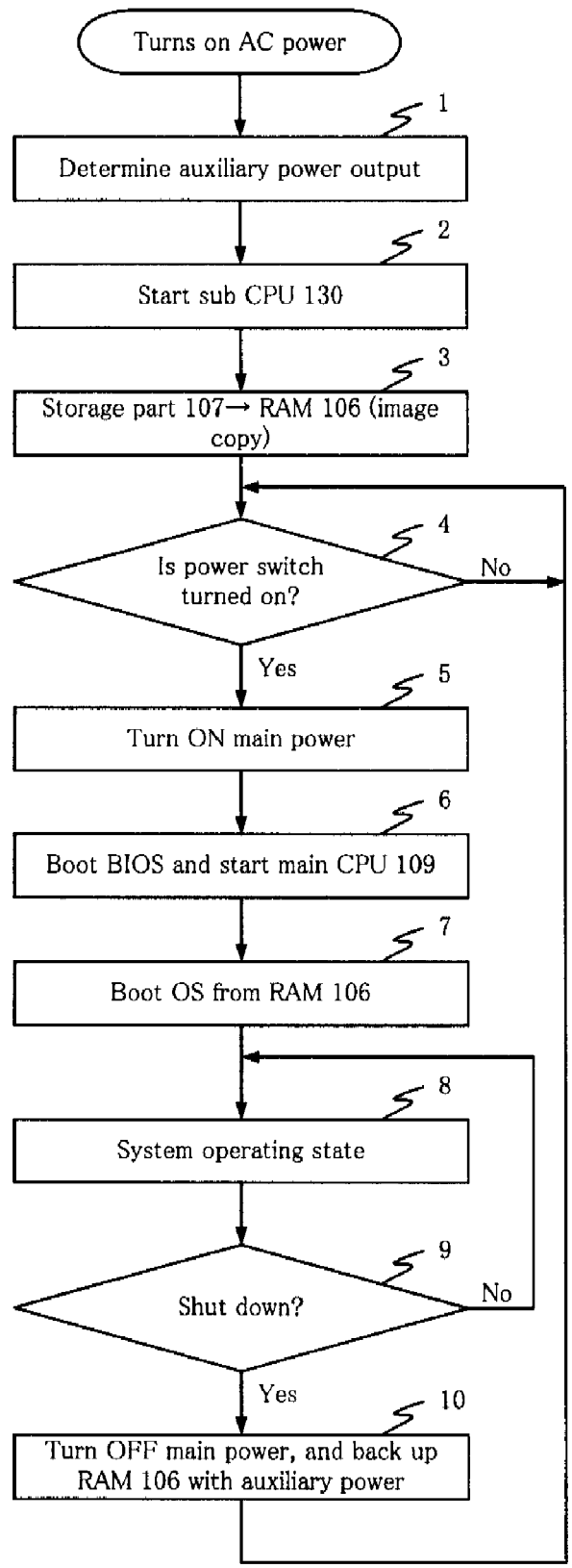
FIG. 3 is a flowchart for explaining a start-up method for the system in the form as shown in FIG. 2.

Referring to FIG. 3, a start-up method for the system with the configuration as shown in FIG. 2 will be described below.

When a power such as AC power is supplied to power supply unit 101 from the outside, auxiliary power supply output is determined in auxiliary power supply unit 102 at step 1, whereby auxiliary power is supplied to sub CPU 103, memory control unit 104, RAM bridge 105, RAM 106 and storage unit 107. Herein, a secondary side power supply voltage that is the main power is not output from power supply unit 101 until the power switch connected to I/O control unit 108 is turned on.

Then, sub CPU 103 to which the auxiliary power is supplied is started at step 2. And an instruction for copying the operating system including the boot image and the application program running on it stored in storage unit 107 from storage unit 107 via RAM bridge 105 to RAM 106 is output from sub CPU 103 to memory control unit 104. And the operating system including the boot image and the application program running on it are copied from storage unit 107 via RAM bridge 105 to RAM 106 by memory control unit 104 at step 3.

Thereafter, it is determined at step 4 whether the power switch connected to I/O control unit 108 is turned on. The power switch may be monitored at a preset period to check whether it is turned on. By changing the predetermined signal at the time that the power switch is turned on, it is possible to detect whether the power switch is turned on. This judgement will continue until the power switch is turned on.

When it is judged that the power switch connected to I/O control unit 108 is turned on, a power-on signal is output from I/O control unit 108 to power supply unit 101. This power-on signal, for which no particular signal format has been specified here, needs to be capable recognizing that the power has been turned on. And when the power-on signal is input into the power supply unit 101, the secondary side power supply voltage that is the main power is output from power supply unit 101 to I/O control unit 108, main CPU 109, RAM 110, and BIOS_ROM 111 at step 5.

When the secondary side power supply voltage is supplied to each component, main CPU 109 is activated at step 6, whereby the initialization and autonomous diagnosis of the hardware is performed, using data stored in BIOS_ROM 111.

Thereafter, at step 7, the operating system including the boot image and the application program running on it, which are stored in RAM 106, are read by memory control unit 104, and are output via I/O control unit 108 onto bus 112, so that the image boot is executed as the system.

Thereby, the time required for system start-up can be greatly shortened as compared with booting up from storage unit 107 that has typically slower access speed.

Herein, the time required for copying the operating system including the boot image and the application program running on it from storage unit 107 into RAM 106 may be very long. In this case, this problem can be avoided if the data copied from storage unit 107 to RAM 106 is limited to the minimum data needed for the system boot and if the remaining data is copied when or after the system is started. Or a method for outputting no secondary side power supply voltage after the completion of copying may be employed.

And the system becomes operable at step 8. While the operating system and the application program are operating, in general, access to the storage device occurs frequently. For example, the program load and save operations and access to virtual memory by the operating system are performed. In this invention, RAM16 is the storage device that is recognized by the system, and the operating system and application program must access RAM106 which has the same high speed access as a normal storage device. Thereby, it is unnecessary to consider improvement of the access speed, or limitation of the write number that is a problem which arises when a semiconductor storage element such as flash memory is employed as the storage device.

Thereafter, when the system is shut down at step 9, the secondary side power supply voltage output that is the main power is turned OFF at step 10, but the state of RAM 106 is maintained by the auxiliary power to enable a fast system boot to be made when the main power is turned on the next time.

In the typical operation, once the primary side power supply voltage of power supply unit 101 is turned on, the power switch or the system controls a power-on signal, and regulates only the secondary side power supply voltage to turn on or off the system power. That is, auxiliary power supply unit 102 continues to operate as long as the primary side power supply voltage is turned on, and the contents stored in RAM 106 are maintained using auxiliary power that is output from auxiliary power supply unit 102 Thereby, when the power switch is turned on the next time, a fast system boot is enabled without again implementing the copying process from storage unit 107 to RAM 106, which was previously implemented.

Also, in a typical operating system in which the typical storage device is used as virtual storage, to reduce the probability of causing disk swap, the main memory capacity is increased for the purpose of improving system performance. However, in the present invention, RAM having high access speed is used as the storage device. Thereby, even when the storage device is used as virtual storage, performance degradation can be minimized. Therefore, even when a number of disk swaps occur due to a multitasking operation, performance degradation can be minimized.

Though RAM bridge 105 is connected to memory control unit 104 in FIG. 2, another pair of RAM bridge and RAM may be connected to memory control unit 104. In this configuration, the contents stored in each RAM unit can be mirrored mutually to improve reliability.

While an exemplary embodiment of the present invention has been described in specific terms, such description is for illustrative purpose only, and it is to be understood that changes and variations may be made without departing from the spirit or scope of the following claims.

What is claimed is:

1. A storage device comprising:
    a non-volatile storage unit for prestoring start-up data that is an operating system including a boot image and an application program running on it to start up a system;
    an auxiliary power supply unit for supplying auxiliary power, which is different from a main power for use in starting up said system, to said storage device;
    start-up RAM for storing said start-up data using said auxiliary power; and
    a memory control unit for reading the start-up data prestored in said storage unit and writing it into said start-up RAM when the auxiliary power is supplied, using said auxiliary power, and reading the start-up data written in said start-up RAM and outputting it to said system when said main power is turned on.

2. The storage device according to claim 1, comprising a plurality of said start-up RAMs, wherein said memory control unit writes the same start-up data in said plurality of start-up RAMs.

3. A method for starting a system using start-up data stored in a storage device having start-up RAM, comprising:
    supplying auxiliary power, which is different from, main power for use in starting up said system, to said storage device;
    reading said start-up data from a storage unit, prestoring said start-up data, using said auxiliary power;
    writing said read start-up data into said start-up RAM, using said auxiliary power;
    reading the start-up data written into said start-up RAM when said main power is turned on; and
    outputting the start-up data read from said start-up RAM to said system.

4. The method according to claim 3, further comprising writing the start-up data read from said storage unit into each of a plurality of said start-up RAMs.

* * * * *